United States Patent

[11] 3,570,542

[72] Inventors Noel Otto;
    Herbert H. Kaemmer, Whippany, N.J.
[21] Appl. No. 860,695
[22] Filed Sept. 24, 1969
[45] Patented Mar. 16, 1971
[73] Assignee Automatic Switch Co.

[54] PILOT OPERATED VALVE HAVING AUXILIARY VALVE CONTROL
9 Claims, 3 Drawing Figs.

[52] U.S. Cl. .................................................. 137/628, 251/29
[51] Int. Cl. .................................................. F16k 31/385
[50] Field of Search .......................................... 251/29; 137/628

[56] References Cited
UNITED STATES PATENTS
2,840,104  6/1958  Shafer ............................ 251/29X
2,918,072  12/1959  Boler ............................ 251/29X Primary Examiner—Arnold Rosenthal
Attorney—Breitenfeld & Levine ABSTRACT: The valve has a main valve member whose position (open or closed) is controlled by a pilot valve adapted to vent the high pressure side of the main valve member. The pilot valve is operated by an actuating means responsive to fluid pressure at an actuating pressure port. The actuating means communicates with the actuating pressure port via an auxiliary or conditioning valve. The conditioning valve is opened by fluid pressure applied to a "set" port, and remains open until fluid pressure is applied to a "trip" port, which closes it. Fluid pressure at the actuating pressure port operates the pilot valve and hence permits opening of the main valve only when the conditioning valve is open. A series of these valves automatically operate sequentially if the outlet port of each communicates with its own trip port and the set port of the next succeeding valve.

Patented March 16, 1971

INVENTORS:
NOEL OTTO
HERBERT H. KAEMMER
BY
Breitenfeld & Levine
ATTORNEYS

INVENTORS:
NOEL OTTO
HERBERT H. KAEMMER
BY
Breitenfeld & Levine
ATTORNEYS

PILOT OPERATED VALVE HAVING AUXILIARY VALVE CONTROL

This invention relates to pilot operated valves, and especially to pneumatic valves adapted to control air flow, and be controlled by differential air pressures. However, it is to be understood that the valve has utility with fluids generally.

It is a general object of the invention to provide a pilot operated valve which responds to an actuating pressure signal to open the main valve only when an auxiliary or conditioning valve is positioned to permit operation of the pilot valve, the valve remaining unresponsive to actuating pressure signals when the conditioning valve is closed.

Such a valve finds usefulness in an installation requiring a series of valves to operate in sequence. All the valves may be conveniently connected to a single source of actuating fluid pressure, but by causing their conditioning valves to open and close in sequence, the main valves are caused to open in sequence in response to the application of the actuating pressure.

A feature of the invention involves the fact that each conditioning valve can be opened, to permit actuation of its associated pilot and main valves, in response to operation of the next preceding valve in the series, and can be closed by operation of its associated main valve, thus making sequential operation of the valves automatic.

A practical application of these valves is in apparatus for shaking air filter bags of dust collector equipment. Such bags require a large volume, rapidly applied, blast of air to effectively shake loose the dust adhering to them. To provide sufficient compressed air to shake all the bags of such equipment simultaneously would require very large air compressing and storage facilities. Therefore, for reasons of economy, it is preferable to shake the bags individually. In the past, filter bag shaking apparatus has required a relatively complex and expensive arrangement of individual valves and pneumatic circuit connections to provide sequential shaking. The valve of the present invention makes it possible to assemble a much simpler arrangement which is just as effective for providing air blasts to the filter bags in sequence.

The present valve is useful not only as part of a filter bag shaking apparatus, but in any situation requiring sequential operation of a series of valves, and in fact in any situation requiring a valve which will not respond to actuating signals until it receives a conditioning single permitting it to react, and which will thereafter continue to respond to actuating signals until it receives another conditioning signal preventing further response.

Additional features and advantages of the invention will be apparent from the following description in which reference is made to the accompanying drawings:

Figure 1:
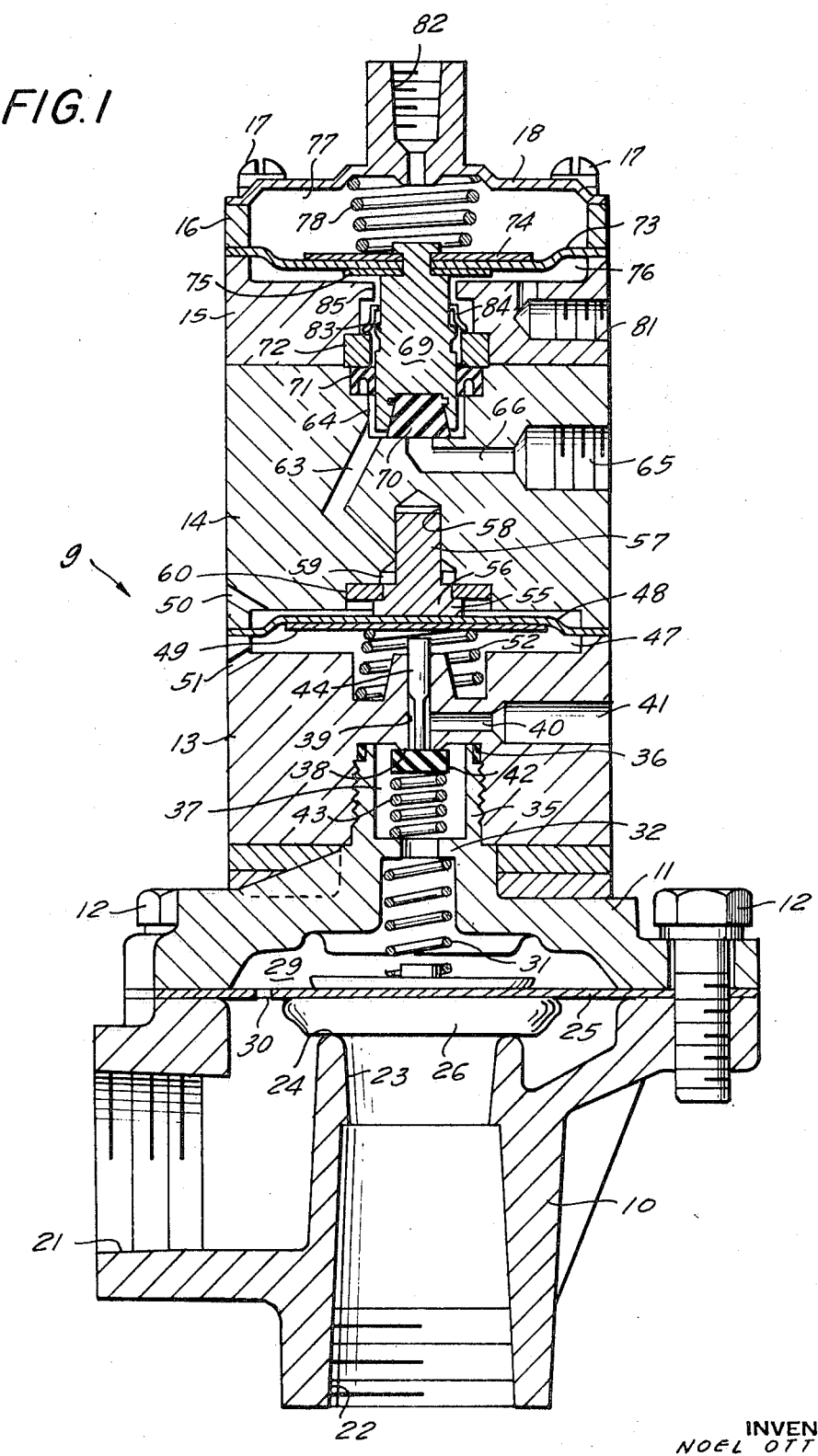
FIG. 1 is a longitudinal cross-sectional view of a valve according to this invention showing the main, pilot, and conditioning valves closed.

The valve 9 chosen to illustrate this invention includes a valve body comprising main sections 10 and 11, fastened together by bolts 12, and auxiliary sections 13, 14, and 15 stacked upon, and secured to, body section 11 by bolts 17 extending through all the auxiliary sections and threaded into main section 11. Bolts 17 also secure a spacer 16 and a cover 18 upon valve body section 15.

Body section 10 is formed with an inlet port 21, an outlet port 22, both adapted for connection to conduits, and an orifice 23 between these ports, a valve seat 24 surrounding the orifice. A diaphragm 25, formed of a suitable flexible and resilient material such as rubber, extends above the orifice 23, the margin of the diaphragm being sandwiched between the body sections 10 and 11. A main valve member 26 carried by the diaphragm 25 is movable into and out of engagement with the valve seat 24 to close and open the main valve, respectively.

Above diaphragm 25 is a chamber 29 communicating with inlet port 21 via a small hole 30 in diaphragm 25. Within chamber 29 is a compression spring 31 seated at its lower end upon valve member 26, and at its upper end against an inwardly projecting flange 32. When chamber 29 is filled with fluid at the inlet pressure, the fluid force against the upper face of diaphragm 25 combined with the force of spring 31 keeps valve member 26 upon seat 24 and closes the main valve, as shown in FIG. 1. If the pressure in chamber 29 is relieved, the inlet pressure acting on the lower face of diaphragm 25 lifts the diaphragm and valve member (FIG. 2), and the main valve remains open as long as the pressure in chamber 29 remains relatively low.

The pressure in chamber 29 is controlled by a pilot valve, to be described now. Projecting upwardly from body section 11 is an externally threaded annular wall 35 received within an internally threaded bore in the lower face of body section 13, the upper end of wall 35 squeezing a seal 36 against the top wall of the bore. Wall 35, together with the top wall of the bore and the flange 32, define a pilot valve chamber 37 communicating with chamber 29 via an opening surrounded by flange 32.

Formed in the top wall of the bore is a pilot valve seat 38 surrounding the lower end of an axial bore 39. A lateral bore 40 extends between bore 39, at a point above seat 38, and a vent opening 41 which opens into a low-pressure region such as the atmosphere. A pilot valve member 42 within chamber 37 is movable toward and away from valve seat 38 to close and open the pilot valve, respectively, i.e., to prevent and establish, respectively, communication between pilot valve chamber 37 and vent opening 41, via bores 39 and 40. Within chamber 37 is a compression spring 43 seated at its upper end against pilot valve member 42 and at its lower end against flange 32. A stem 44 is slidably arranged within bore 39, the upper end of the stem having a diameter slightly smaller than the diameter of bore 39, and the lower end of the stem having a reduced diameter to permit free communication through bore 39 between chamber 37 and vent opening 41.

When chamber 29 and hence chamber 37 are filled with fluid at the inlet pressure, the fluid force against the lower face of pilot valve member 42, combined with the force of spring 43 keeps valve member 42 upon seat 38 and closes the pilot valve, as shown in FIG. 1. If stem 44 is shifted downwardly, pilot valve member 42 is pushed away from seat 38, against the force of spring 31 and the fluid force, thereby opening the pilot valve, and allowing the fluid above diaphragm 25 to rush out of chambers 29 and 37 via bores 39 and 40 and vent opening 41, thereby permitting the main valve to open.

Shifting of stem 44 is controlled by an actuating means to be described now. The opposing faces of body sections 13 and 14 are shaped to define a chamber 47 across which a flexible diaphragm 48 extends, the margin of the diaphragm being sandwiched between body sections 13 and 14. A protective plate 49, which may be metal, is secured as by adhesive to the bottom face of diaphragm 48. The regions of chamber 47 above and below diaphragm 48 communicate with a low-pressure region, such as the atmosphere, via channels 50 and 51, respectively. Thus, any high pressure fluid flowing through bore 39 into chamber 47, when the pilot valve is opened, is exhausted through channel 51. A compression spring 52, seated at its lower end against body section 13 and at its upper end against plate 49, tends to hold diaphragm 48 in its upper position indicated in FIG. 1.

Seated on the upper face of diaphragm 48 is a disc 55 having a reduced diameter portion 56 topped by a guide pin 57, the latter being slidable within a guide bore 58 in body section 14. Between its ends, the diameter of bore 58 increases to define an annular chamber 59 surrounding guide pin 57, and at its lower end the diameter of bore 58 increases further to accommodate an annular seat 60. The inner diameter of seat 60 is about equal to the diameter of disc portion 56 so that the latter fits snugly within seat 60 when disc 55 about the lower face of the seat under the influence of spring 52, as shown in FIG. 1.

To move disc 55 and diaphragm 48 downwardly against the force of spring 52, to effect downward shifting of stem 44 to open the pilot valve, the pressure within chamber 59 must be increased. To this end, a channel 63 within body section 14 establishes communication between chamber 59 and a conditioning valve chamber 64 defined by a bore in the upper face of body section 14. Chamber 64 also communicates via a channel 66, when the conditioning valve is open, with an actuating pressure port 65, adapted to be connected to a conduit.

The conditioning valve includes a valve member 69 of rigid material carrying a resilient element 70 at its lower end adapted to be pressed against a conditioning valve seat, defined by the portion of the bottom wall of chamber 64 surrounding the opening of channel 66 into chamber 64, to close the conditioning valve, as shown in FIG. 1. At its upper end, the diameter of chamber 64 is enlarged to accommodate a U-cup seal 71 snugly but slidably accommodating the conditioning valve member 69. Vertical movement of valve member 69 is guided by a ring 72 fitted within the lower end of a stepped diameter bore in body section 15. To effect this movement, the upper end of valve member 69 is connected to a diaphragm assembly comprising a flexible diaphragm 73, the margin of which is sandwiched between the body section 15 and spacer 16, and the central portion of which is sandwiched between protective plates 74 and 75. A compression spring 78 seated between cover 18 and plate 74 urges valve member 69 downwardly toward its closed position (FIG. 1).

Figure 2:
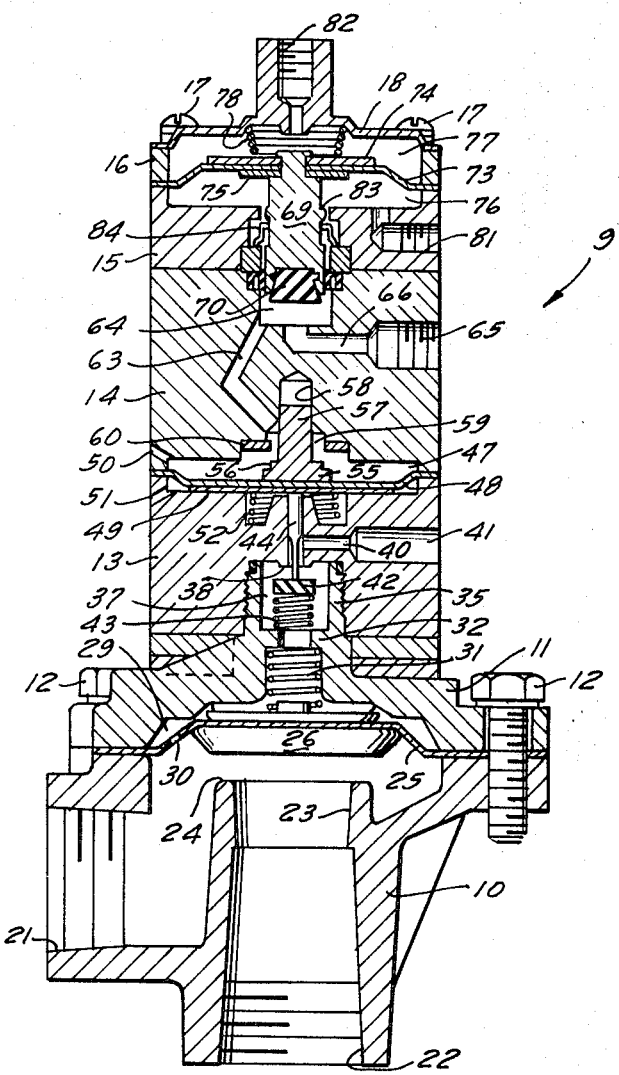
FIG. 2 is a view similar to FIG. 1, on a reduced scale, showing the main, pilot, and conditioning valves open.

The upper face of body section 15 is formed to define a chamber 76 beneath diaphragm 73, and a chamber 77 is defined above diaphragm 73 by spacer 16 and cover 18. A set port 81 formed in body section 15 communicates with chamber 76, and a trip port 82 carried by cover 18 communicates with chamber 77, both ports being adapted for connection to conduits. It is apparent that fluid pressure applied to set port 81 causes lifting of diaphragm 73 and conditioning valve member 69, as shown in FIG. 2, and fluid pressure applied to trip port 82 causes downward movement of diaphragm 73 and valve member 69, as shown in FIG. 1.

Conditioning valve member 69 is mechanically maintained in either its upper, valve open, position or its lower, valve closed, position, after movement by fluid pressure applied to the set or trip port, respectively, by cooperable detents. Valve member 69 is formed with an annular detent 83 adapted to cooperate with a resilient detent in the form of a snap ring 84 located between guide ring 72 and an inwardly projecting flange portion 85 of body section 15. The resilience of the snap ring permits detent 83 to pass through it when sufficient force is applied, but the snap ring 83 is capable of supporting detent 83, against the force of spring 78, to maintain the conditioning valve open, as shown in FIG. 2, and is capable together with spring 78 of keeping the valve closed against any actuating pressure which may be applied to element 70. If desired, the resilient detent can be carried by valve member 69 and the rigid detent formed in valve body section 15.

Operation of the valve is as follows: assume the valve is in the condition of FIG. 1 and it is desired to open the main valve to permit fluid flow from inlet port 21 to outlet port 22. Fluid pressure is applied to set port 81, and this pressure acts upon the relatively large surface area of the bottom face of diaphragm 73. As a result, sufficient upward force is applied to diaphragm 73 to overcome the force of spring 78 and to move detent 83 upwardly past snap ring 84, whereby the conditioning valve is opened, and valve member 69 is maintained in its upper position by the cooperation of snap ring 84 and detent 83. The valve is now conditioned to operate upon application of fluid pressure to actuating pressure port 65.

Actuating fluid pressure at port 65 is transmitted via channel 66, conditioning valve chamber 64, and channel 63 to chamber 59 above disc 55. When the pressure in chamber 59 reaches a predetermined value, dependent upon the force of spring 52, the pressure suddenly blows disc portion 56 out of seat 60 and the pressure then acts upon the relatively large area of the upper face of diaphragm 48, thereby driving the diaphragm 48 downwardly (FIG. 2). The downward force on diaphragm 48 is sufficient to overcome the forces of springs 52 and 43, whereby the downward movement of the diaphragm is transmitted to pilot valve member 42 by stem 44, causing valve member 42 to move away from its seat 38, whereupon the pilot valve is open. Inlet fluid pressure in chambers 29 and 37 is rapidly exhausted through bores 39 and 40 and vent opening 41, permitting main valve member 26 to be lifted off seat 24, whereby the main valve is opened (FIG. 2). The main valve remains open as long as actuating fluid pressure acts on the upper face of diaphragm 48. Thus, the main valve will close when either actuating pressure is removed from port 65, or when conditioning valve closes.

The conditioning valve can be closed by applying fluid pressure to trip port 82, this pressure acting on the relatively large surface area of the top face of diaphragm 73. As a result, a sufficient downward force is applied to a diaphragm 73 to move detent 83 downwardly past snap ring 84 FIG. 1) 1) whereupon the snap ring and spring 78 cooperate to press valve element 70 downwardly to close the conditioning valve and block communication between actuating pressure port 65 and chamber 59. With actuating pressure removed from the upper face of diaphragm 48, the pressure above the diaphragm drops to atmospheric due to the presence of channel 50, and spring 52 returns the diaphragm and disc 55 to their upper positions (FIG. 1) relieving the downward force on stem 44. Spring 43 is then free to push pilot valve member 42 against a seat 38 to close the pilot valve. Inlet pressure quickly builds up in chamber 29, via hole 30, and the resulting downward force on diaphragm 25 presses main valve member 26 against its seat 24 (FIG. 1).

In the condition shown in FIG. 1, the presence of fluid pressure at actuating pressure port 65 will not effect opening of the main valve since the conditioning valve is closed. Only after application of fluid pressure to set port 81, to open the conditioning valve, will fluid pressure at port 65 serve to cause opening of the pilot and main valves. The valve then remains responsive to pressure at port 65, whether applied continuously or intermittently, until pressure is applied to trip port 82 to close the conditioning valve.

Figure 3:
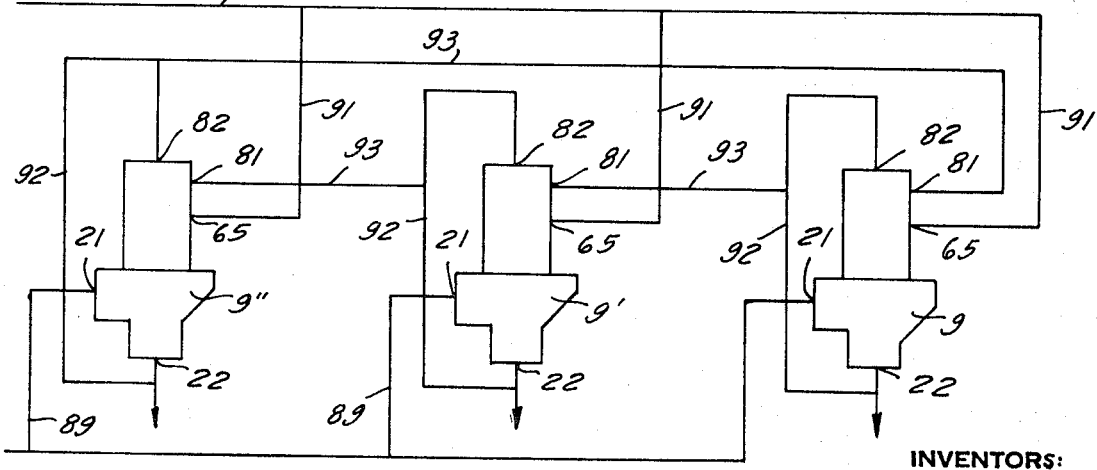
FIG. 3 is a schematic diagram showing a series of such valves connected for sequential operation.

The manner in which a series of valves 9, 9' and 9'' of the type described above can be interconnected so that they automatically operate in sequence is shown in FIG. 3. Conduit 88 contains high pressure fluid and is connected by branch conduits 89 to the inlet ports 21 of valves 9, 9' and 9''. The outlets 22 of the valves may be connected to apparatus for separately shaking individual filter bags (not shown). A conduit 90 contains actuating pressure fluid and is connected by branch conduits 91 to the actuating pressure ports 65 of all the valves. Furthermore, the outlet port 22 of each valve communicates via a conduit 92 with its own trip port 82 and via conduits 92 and 93 with the set port 81 of the next successive valve. Thus, for example, outlet port 22 of valve 9 communicates with trip port 82 of valve 9 and with set port 81 of valve 9'. Also, outlet port 22 of the last valve 9'' in the series communicates with its own trip port 82 and with the set port of the first valve 9 in the series.

Actuating fluid pressure may be present in conduit 90 either constantly or intermittently. Assume for the sake of this explanation that actuating pressure is provided to conduit 90 in intermittent pulses at regular intervals via a timer operated solenoid valve (not shown). Also, assume that the conditioning valve of valve 9 is open, but the conditioning valves of valves 9' and 9'' are closed. When the first pulse appears in conduit 90, it is applied to the actuating pressure ports 65 of all these valves, but since the conditioning valve of only valve 9 is open, only valve 9 responds, and its main valve opens to permit flow from conduit 88 to outlet port 22 of valve 9, whereby the filter bag associated with valve 9 is shaken.

Part of the fluid flow from outlet port 22 bleeds into conduit 92 and hence fluid pressure is applied to the trip port 82 of valve 9 and to the set port 81 of valve 9'. Consequently, the conditioning valve of valve 9 closes, and the conditioning valve of valve 9' opens. Therefore, when the next pulse appears in conduit 90, only valve 9' responds and high pressure fluid flows from conduit 88 through outlet port 22 of valve 9', whereby the filter bag associated with valve 9' is shaken. Part of the flow from outlet port 22 of valve 9' serves to close the conditioning valve of valve 9' and open the conditioning valve of valve 9'', so that only valve 9'' responds to the next pulse in conduit 90. This action continues with each valve being operated in sequence. Obviously, as many valves as desired may be arranged in series for sequential operation as described above.

If actuating fluid pressure exists constantly in conduit 90, operation of the valves will be exactly as described above, except that the valves will be operated rapidly one after the other, rather than experiencing delays between operations corresponding to the delays between pulses. Furthermore, the valve of the present invention need not necessarily be used as one of a series of sequentially operated valves. A single valve may be employed where it is to be operated in a remote location in which an electrical operator might be hazardous, and therefore pneumatic operation is preferred, and in a situation requiring a valve which remains positioned according to the last pulse received. Such pulses can be applied to the set and trip ports of the valves by electrically or mechanically operated valves.

The invention has been shown and described in preferred form only, and by way of example, and it is understood, therefore, that many variations may be made in the invention which will still be comprised within its spirit.

We claim:

1. A valve comprising:
   a. a valve body having an inlet port, an outlet port, and an orifice between said ports surrounded by a valve seat;
   b. a main valve member movable into and out of engagement with said valve seat to close and open the valve, respectively;
   c. a chamber on the side of said valve member opposite said valve seat, said chamber communicating with said inlet port, whereby inlet pressure is applied to said opposite side of said valve member to keep the valve closed;
   d. a vent opening in said body;
   e. a pilot valve carried by said body establishing communication between said chamber and said vent opening, whereby when said pilot valve is opened the pressure in said chamber is reduced and the valve is permitted to open;
   f. a conditioning valve carried by said body and having an open and a closed position;
   g. a set port and a trip port in said body for alternatively receiving pressurized fluid to open and close said conditioning valve, respectively;
   h. an actuating pressure port in said body adapted to be connected to a source of fluid pressure; and
   i. actuating means communicating with said actuating pressure port via said conditioning valve, and responsive to the presence of pressure at said actuating pressure port when said conditioning valve is open for opening said pilot valve;

whereby when said conditioning valve is open, fluid pressure at said actuating pressure port causes said pilot valve to open and said chamber to be vented whereupon said valve member (b) moves away from said valve seat, but when said conditioning valve is closed, fluid pressure at said actuating pressure port is ineffective to open said pilot valve and said valve member (b) remains in engagement with said valve seat.

2. A valve as defined in claim 1 wherein said conditioning valve (f) includes an orifice through which said actuating pressure port (h) communicates with said actuating means (i), a valve member movable toward and away from said conditioning valve orifice to close and open the latter, respectively, a spring urging said conditioning valve member toward its closed position, and means for holding said conditioning valve member in its open position against the force of said spring following application of fluid pressure to said set port.

3. A valve as defined in claim 2 wherein said last-named means includes detents carried by said valve body and said conditioning valve member, at least one of said detents being resiliently biased toward the other, said detents becoming engaged following application of fluid pressure to said set port, and said detents becoming disengaged and said conditioning valve closing following application of fluid pressure to said trip port.

4. A valve as defined in claim 2 including a diaphragm fixed to said conditioning valve member, said set port communicating with one face of said diaphragm and said trip port communicating with the opposite face.

5. A valve as defined in claim 1 wherein said pilot valve comprises an orifice, and a valve member movable toward and away from said orifice, and including a spring urging said pilot valve member toward said pilot orifice to close the latter, and a stem engaging said pilot valve member and extending through said pilot orifice, said stem transmitting movement of said actuating means to said pilot valve member for opening said pilot orifice.

6. A valve as defined in claim 5 wherein said actuating means includes a diaphragm, and a spring urging said diaphragm in a direction which permits said pilot valve member to close said pilot orifice, said diaphragm responding to fluid pressure from said actuating pressure port for moving said pilot valve member via said stem away from said pilot orifice against the force of said springs acting on said pilot valve member and said actuating means diaphragm.

7. A valve as defined in claim 1 including a diaphragm supporting said valve member (b), a hole in said diaphragm establishing communication between said chamber (c) and said inlet port.

8. A series of valves as defined in claim 1, the outlet port of each valve communicating with the trip port of that valve and with the set port of the next succeeding valve, whereby said valves operate in sequence.

9. A series of valves as defined in claim 8 wherein the inlet ports of all said valves are connected to a single source of main line pressure, and the actuating pressure ports of all said valves are connected to a single source of actuating pressure.